United States Patent
Kitazato et al.

(10) Patent No.: US 11,039,212 B2
(45) Date of Patent: *Jun. 15, 2021

(54) RECEPTION DEVICE

(71) Applicant: Saturn Licensing LLC, New York, NY (US)

(72) Inventors: Naohisa Kitazato, Tokyo (JP); Yasuaki Yamagishi, Kanagawa (JP)

(73) Assignee: Saturn Licensing LLC, New York, NY (US)

(*) Notice: Subject to any disclaimer, the term of this patent is extended or adjusted under 35 U.S.C. 154(b) by 5 days.

This patent is subject to a terminal disclaimer.

(21) Appl. No.: 16/539,816

(22) Filed: Aug. 13, 2019

(65) Prior Publication Data

US 2019/0373321 A1    Dec. 5, 2019

Related U.S. Application Data

(63) Continuation of application No. 15/893,177, filed on Feb. 9, 2018, now Pat. No. 10,425,688, which is a
(Continued)

(30) Foreign Application Priority Data

Dec. 3, 2013 (JP) ................................ 2013-250117

(51) Int. Cl.
*H04N 21/462* (2011.01)
*H04N 21/2343* (2011.01)
(Continued)

(52) U.S. Cl.
CPC ......... *H04N 21/4621* (2013.01); *H04N 19/30* (2014.11); *H04N 21/233* (2013.01);
(Continued)

(58) Field of Classification Search
None
See application file for complete search history.

(56) References Cited

U.S. PATENT DOCUMENTS

| 2011/0085077 A1 | 4/2011 | Yamashita |
| 2013/0058480 A1 | 3/2013 | Ziskind et al. |
| 2013/0081088 A1 | 3/2013 | Hwang et al. |

FOREIGN PATENT DOCUMENTS

| EP | 2 117 142 A2 | 11/2009 |
| EP | 2 667 595 A2 | 11/2013 |

(Continued)

OTHER PUBLICATIONS

Extended European Search Report issued in European Patent Application No. 14868680.1dated Aug. 31, 2017.
(Continued)

*Primary Examiner* — Justin E Shepard
(74) *Attorney, Agent, or Firm* — Oblon, McClelland, Maier & Neustadt, L.L.P.

(57) ABSTRACT

The present invention relates to a reception device that can select an optimal component. The reception device includes a first reception unit that receives a video or audio component transmitted on a broadcast wave, a second reception unit that receives a video or audio component distributed via a network, and a control unit that controls the operation of each unit. The control unit selects the optimal video or audio component from a plurality of video and audio components that the reception device can receive.

18 Claims, 15 Drawing Sheets

Related U.S. Application Data continuation of application No. 15/038,516, filed as application No. PCT/JP2014/080577 on Nov. 19, 2014, now Pat. No. 9,955,219.

(51) Int. Cl.

| | | |
|---|---|---|
| *H04N 21/434* | (2011.01) | |
| *H04N 21/234* | (2011.01) | |
| *H04N 21/488* | (2011.01) | |
| *H04N 19/30* | (2014.01) | |
| *H04N 21/233* | (2011.01) | |
| *H04N 21/235* | (2011.01) | |
| *H04N 21/242* | (2011.01) | |
| *H04N 21/43* | (2011.01) | |
| *H04N 21/435* | (2011.01) | |
| *H04N 21/439* | (2011.01) | |
| *H04N 21/44* | (2011.01) | |
| *H04N 21/438* | (2011.01) | |

(52) U.S. Cl.
CPC ....... *H04N 21/234* (2013.01); *H04N 21/2343* (2013.01); *H04N 21/2353* (2013.01); *H04N 21/23412* (2013.01); *H04N 21/23424* (2013.01); *H04N 21/23439* (2013.01); *H04N 21/234327* (2013.01); *H04N 21/242* (2013.01); *H04N 21/435* (2013.01); *H04N 21/4307* (2013.01); *H04N 21/439* (2013.01); *H04N 21/4348* (2013.01); *H04N 21/44016* (2013.01); *H04N 21/4884* (2013.01); *H04N 21/434* (2013.01); *H04N 21/438* (2013.01)

(56) References Cited

FOREIGN PATENT DOCUMENTS

| | | |
|---|---|---|
| EP | 2 784 954 A1 | 10/2014 |
| EP | 2 849 440 A1 | 3/2015 |
| JP | 2011-066556 A | 3/2011 |
| JP | 2011-181075 A | 9/2011 |
| JP | 2013-157820 A | 8/2013 |
| KR | 10-2012-0083747 A | 7/2012 |
| KR | 10 2013 0040156 | 4/2013 |
| WO | 2008/155595 A1 | 12/2008 |
| WO | 2012/009700 A1 | 1/2012 |
| WO | 2013/077698 A1 | 5/2013 |
| WO | 2013/0161688 A1 | 10/2013 |
| WO | 2013/169084 A1 | 11/2013 |

OTHER PUBLICATIONS

Office Action issued in corresponding European Application No. 14 868 680.1dated Mar. 20, 2019 in, 8 pages.

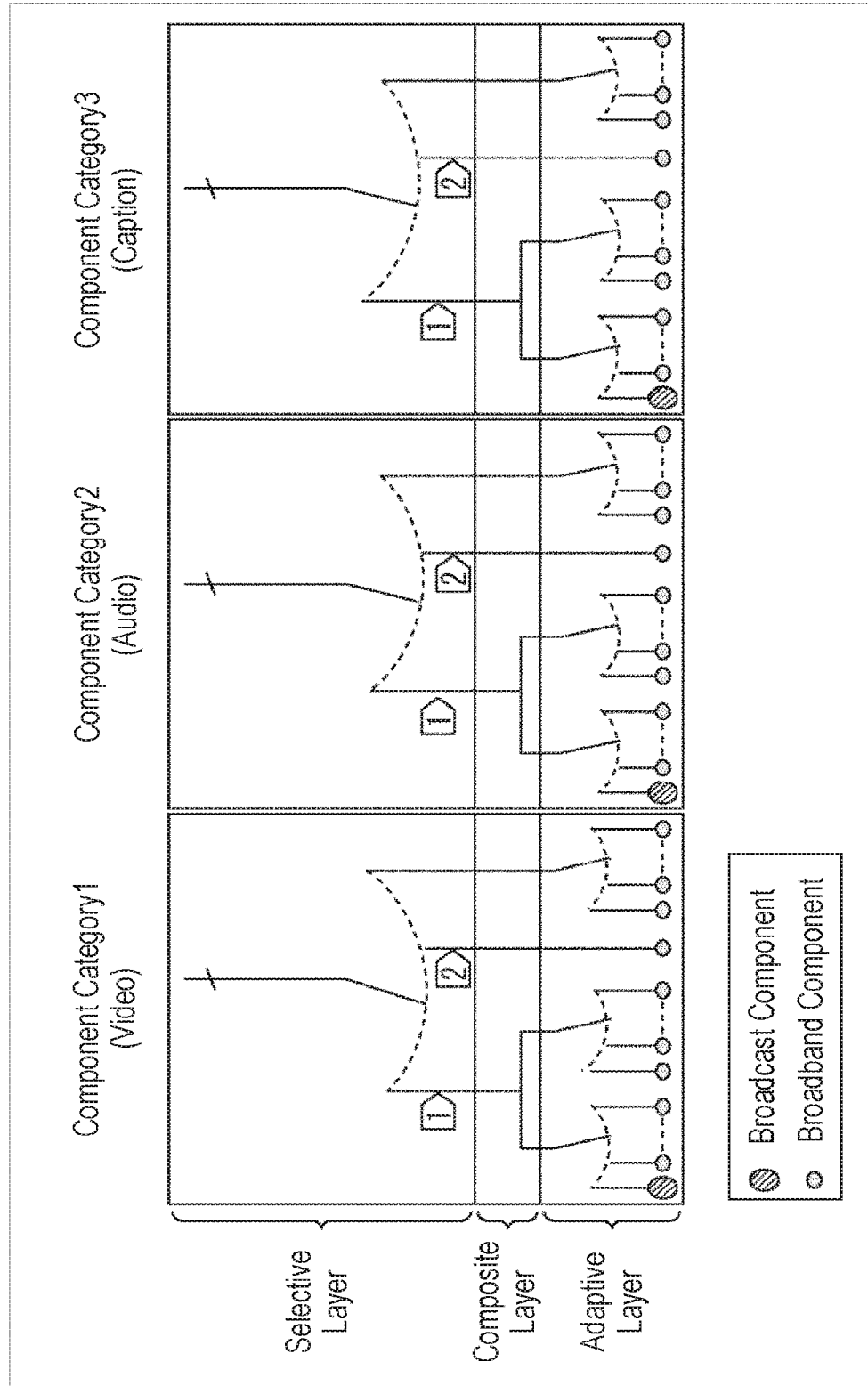

FIG. 2

| | FREQUENCY OF APPEARANCE | |
|---|---|---|
| @topAttribute | 1..m0 | ATTRIBUTE FOR FINAL SELECTION (m0 TYPES) |
| SelectiveComponentGroup | 1..n1 | COMPONENT GROUP TO BE STATICALLY SELECTED |
| @selectiveAttribute1..m1 | 0..m1 | ATTRIBUTE OF COMPONENT TO BE STATICALLY SELECTED (m1 TYPES) |
| CompositeComponentGroup | 1..n2 | COMPONENT GROUP TO BE SYNTHESIZED |
| @compositeAttribute1..m2 | 0..m2 | ATTRIBUTE OF COMPONENT TO BE SYNTHESIZED (m2 TYPES) |
| AdaptiveComponent | 1..n3 | COMPONENT (TO BE ADAPTIVELY SELECTED) |
| @adaptiveAttribute1..m3 | 0..m3 | ATTRIBUTE OF COMPONENT TO BE ADAPTIVELY SELECTED (m3 TYPES) |
| @componentId | 1 | COMPONENT ID |

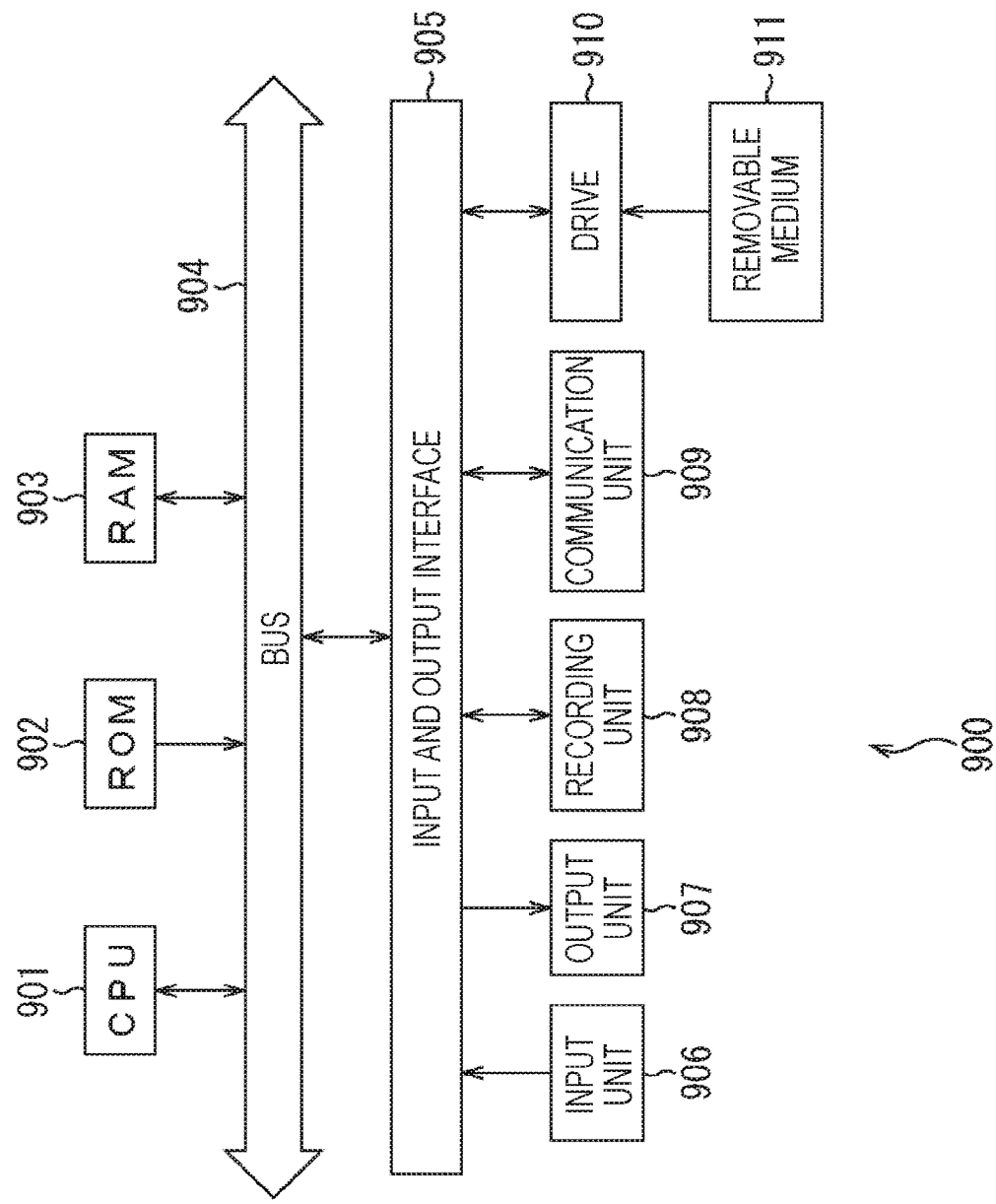

RECEPTION DEVICE

CROSS-REFERENCE TO RELATED APPLICATIONS

This is a continuation of U.S. application Ser. No. 15/893,177, filed Feb. 9, 2019, which is a continuation of U.S. application Ser. No. 15/038,516, filed May 23, 2016, which is a U.S. National Phase Application of International Application No. PCT/JP2014/080577, filed Nov. 19, 2014, which is based on and claims priority to Japanese Application No. 2013-250117, filed Dec. 3, 2013.

TECHNICAL FIELD

The present invention relates to a reception device and, in particular, relates to a reception device that can select an optimal component.

BACKGROUND ART

Not only services using broadcast but also hybrid services in collaboration with communication has been introduced in the fields of digital broadcasting (for example, Patent Document 1). The components, such as a video component, an audio component, and a caption component, forming a service can be transmitted via broadcast or communication in such hybrid services.

CITATION LIST

Patent Document 1: Japanese Patent Application Laid-Open No. 2011-66556

SUMMARY OF THE INVENTION

Problems to be Solved by the Invention

It is assumed that the introduction of hybrid services makes the structure of the components forming a service complicated while enabling the provision of various services. However, a technical scheme for selecting the optimal component for each service is not established.

In the light of the foregoing, the present invention facilitates the selection of the optimal component for each service.

Solutions to Problems

A reception device according to an aspect of the present invention includes: a first reception unit that receives a component transmitted on a broadcast wave; a second reception unit that receives a component distributed via a network; and a control unit that controls operation of each unit, wherein the control unit selects an optimal component from a plurality of components that the reception device is able to receive.

The reception device can be an independent device or an internal block included in a device.

The reception device according to an aspect of the present invention receives a component transmitted on a broadcast wave, receives a component distributed via a network, and selects the optimal component from a plurality of component candidates that can be received.

Effects of the Invention

According to an aspect of the present invention, an optimal component can be selected.

The effects of the present invention are not limited to the effects described herein, and can be any one of the effects described herein.

BRIEF DESCRIPTION OF DRAWINGS

FIG. 1 is a diagram of a component layer structure.
FIG. 2 is a diagram of an exemplary structure of signaling information.
FIG. 16 is a diagram of an exemplary configuration of a computer.

MODE FOR CARRYING OUT THE INVENTION

Figure 3:
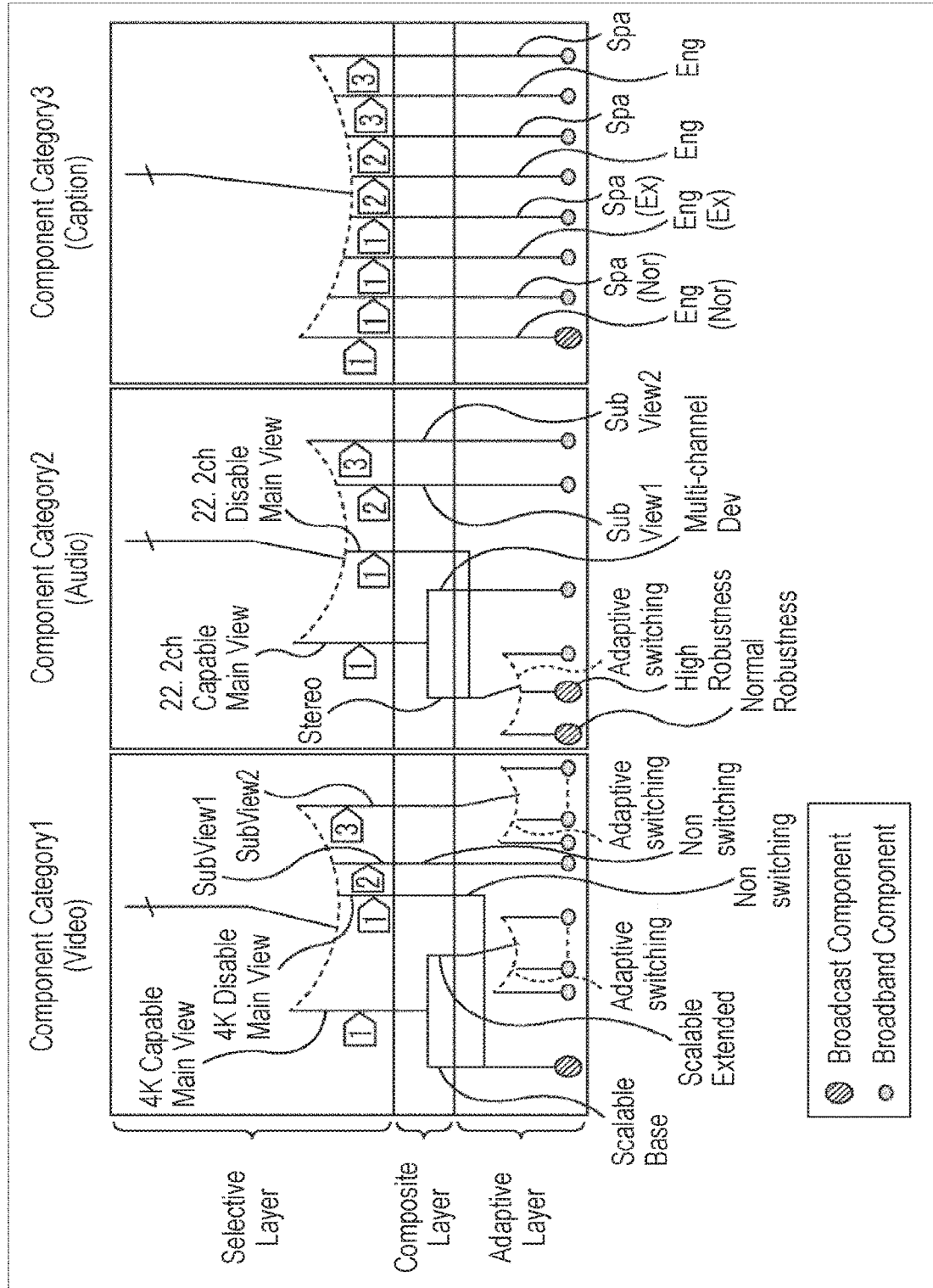
FIG. 3 is a diagram of a specific example of component layers.

The embodiments of the present invention will be described hereinafter with reference to the appended drawings. Note that the embodiments will be described in the following order.

1. Component Structure
2. System Configuration
3. Flow of Process Performed in Each Device
4. Specific Example of Operation
5. Computer Configuration

1. Component Structure

Component Layer Structure

FIG. 1 is a diagram of a component layer structure.

As illustrated in FIG. 1, each of a video component (Video), an audio component (Audio), and a caption component (Caption) includes three layers, a selective layer (Selective Layer), a composite layer (Composite Layer), and an adaptive layer (Adaptive Layer). In the layer structure, the composite layer is placed as the upper layer of the adaptive layer, and the selective layer is placed as the upper layer of the composite layer. The details of each layer will be described in order hereinafter.

Adaptive Layer

The adaptive layer will be described first. As illustrated in FIG. 1, one of circular symbols with different patterns indicates a component transmitted on a broadcast wave (Broadcast Component), and the other circular symbol indicates a component distributed via a network (Broadband Component) on the adaptive layer that is the lowest layer. These components are distributed as so-called adaptive streaming, and a plurality of components at different bit rates is prepared. A broadcast component is prepared for each category in the example of FIG. 1. Note that, however, a plurality of broadcast components can be prepared. Furthermore, the classification of the video component, the audio component, and the caption component is herein referred to as a category (CATEGORY).

A line that swings right and left on a dotted arc in the drawing functions as a switch in the adaptive layer. This selects a component from the components. In other words, the adaptive layer is a layer for dynamically switching the components in accordance with the adaptive determination by the receiver in each of the component categories and causing the components to function as a component. Note that, when there is only a component, the component is constantly selected without the selection with the switch.

The transmission channel or bit rate of the components can be designated as the attribute of the components to be adaptively selected in the adaptive layer. For example, broadcast or communication is designated as the attribute value of the transmission channel. For example, 10 Mbps is designated as the bit rate. For example, an attribute about screen resolution or robustness of a physical layer (PHY) can be designated. Note that the attributes of the components to be adaptively selected are examples and another attribute can be designated.

The attribute can be designated as described above. This enables the receiver to implement adaptive streaming distribution by switching the components and adaptively selecting the optimal component every predetermined period (for example, every 10 seconds). Specifically, when the transmission channel of the component is only communication, the component at the optimal bit rate can be selected in response to the occupation of a reception buffer (for example, a reception buffer 421 to be described below with reference to FIG. 12) in the receiver and the occupation varies depending on the congestion of the communication channel.

Alternatively, when the transmission channel of the component includes also broadcast in addition to communication, the selection between the communication component and the broadcast component can be determined in accordance with the bit rate of the broadcast component. For example, it is assumed in this example that components at 1 Mbps, 2 Mbps, 5 Mbps, 10 Mbps, and 20 Mbps are prepared as the components to be distributed via the network, and only a component at 8 Mbps is prepared as the component to be transmitted on a broadcast wave.

When the receiver can receive the communication components at 10 and 20 Mbps, the bit rate is higher than the bit rate of the broadcast component in this example. Thus, the receiver preferentially receives the communication components. When it is difficult to receive the communication components at 10 and 20 Mbps due to congestion and the receiver can receive the communication component at 5 Mbps, the receiver can select the broadcast component at 8 Mbps that the receiver can stably receive instead of the communication components. Note that, when a plurality of broadcast components is prepared, for example, the variations in Carrier/Noise (C/N) of the broadcast signal are measured and the broadcast components can adaptively be switched in response to the result from the measurement.

Composite Layer

The composite layer will be described next. As illustrated in FIG. 1, the components adaptively selected in the adaptive layer are synthesized as a component in the composite layer that is the upper layer of the adaptive layer. In other words, the composite layer is a layer for combining the components in a group of the components to be synthesized (hereinafter, referred to as a "composite component group") and causing the synthesized components to function as a component (synthesized component) in each component category. Note that, when there is only a component in a group of the components to be synthesized, the synthesizing operation is unnecessary.

For example, "scalable", "three-dimensional image (3D)", "tile", "layer", and "mixing" can be designated as the attribute of the components to be synthesized in the composite layer. Each of the attributes indicates a type of combination of the components, and an attribute value indicating the element of the combination can be designated.

The "scalable" is an attribute indicating that the component to be synthesized is a component encoded in scalable coding. "Base" or "Extended" is designated as the attribute value of the "scalable" attribute.

For example, in order to provide an image at 4K resolution, an encoded signal (video component) corresponding to an image at 2K resolution for which "Base" is designated as the attribute value of the "scalable" attribute is transmitted on a broadcast wave. Meanwhile, an encoded image signal (video component) corresponding to the difference between the image at 4K resolution and the image at 2K resolution is distributed via the network while "Extended" is designated as the attribute value of the "scalable" attribute. Thus, a receiver compatible with 4K resolution can synthesize the base stream (Base Stream) transmitted via broadcast and the extended stream (Extended Stream) transmitted via communication, and display the image at 4K resolution. On the other hand, a receiver that is not compatible with 4K resolution displays the image at 2K resolution using the base stream transmitted via broadcast.

The "3D" is an attribute indicating that the component to be synthesized is a component for a 3D image. "Right" or "Left" is designated as the attribute value of the "3D" attribute. For example, the signal of a right-eye image (video component) for which "Right" is designated as the attribute value of the "3D" attribute is transmitted on a broadcast wave. Meanwhile, the signal of a left-eye image (video component) for which "Left" is designated as the attribute value of the "3D" attribute is distributed via the network. Thus, a receiver compatible with a 3D image can synthesize the right-eye image signal and the left-eye image signal, and display the 3D image.

The "tile" is an attribute indicating that the component to be synthesized is a tiled component. For example, "TileA1", "TileA2", "TileB1", "TileB2", . . . , or "TileC1", "TileC2", . . . are designated as the attribute value of the "tile" attribute.

For example, the "TileA" of the "TileA1", "TileA2", . . . indicates that the type of the tiling is a type A. When the tiling type A is a scheme in which two tiled images are arranged right and left and displayed, the signal of the tiled image (video component) for which "TileA1" is designated as the attribute value of the "tile" attribute and which is to be arranged on the left side is transmitted on a broadcast wave, and the signal of the tiled image (video component) for which "TileA2" is designated as the attribute value of the "tile" attribute and which is to be arranged on the right side is distributed via the network. Thus, a receiver compatible with tiling display can synthesize the left-tiled image signal and the right-tiled image signal, and display an image in accordance with the tiling type A.

Similarly, for example, when a tiling type B is a scheme in which four tiled images are arranged two by two and displayed, the signals for the four tiled images (video components) are transmitted via broadcast or communication. Thus, a receiver can synthesize the tiled images, and display the two by two images in accordance with the tiling type B. For example, when a tiling type C is a scheme in which a plurality of tiled images is arranged as a panoramic image (for example, 360 degrees) and displayed, the signals of the tiled images (video components) are transmitted via broadcast or communication. Thus, a receiver can synthesize the tiled image signals, and display the panoramic image in accordance with the tiling type C. Note that the types A to C of the tiling schemes are examples, and another tiling scheme can be used.

The "layer" is an attribute indicating that the component to be synthesized is a component layer displayed as a layer. "Layer1", "Layer2", . . . are designated as the attribute value of the "layer" attribute, for example, in the layering order from the lowest layer. For example, the signal of the first-layer image (video component) for which "Layer1" is designated as the attribute value of the "layer" attribute is transmitted on a broadcast wave. Meanwhile, the signal of the second-layer image (video component) for which "Layer2" is designated as the attribute value of the "layer" attribute is distributed via the network. Thus, a receiver compatible with layer display can synthesize the first-layer image signal and the second-layer image signal, and display an image that the second-layer image is layered on the first-layer image.

The "mixing" is an attribute indicating that the component to be synthesized is a component to be mixed. For example, "Track1", "Track2", . . . are designated as the attribute value of the "mixing" attribute. For example, a voice track (audio component) for which "Track1" is designated as the attribute value of the "mixing" attribute is transmitted on a broadcast wave. Meanwhile, a voice track (audio component) for which "Track2" is designated as the attribute value of the "mixing" attribute is distributed via the network. Thus, a receiver compatible with mixing can mix the voice track 1 and the voice track 2 (for example, adjust the volume relative positions or the panning position), and output the mixed voice.

Note that the attributes of the components to be synthesized in the composite layer and the attribute values are examples, and another attribute and another attribute value can be designated.

Selective Layer

The selective layer will be described last. As illustrated in FIG. 1, a line that swings right and left on a dotted arc in the drawing functions as a switch, and a component is selected from a plurality of components in the selective layer that is the upper layer of the composite layer and the highest layer. In other words, the selective layer is a layer for statically selecting one or a plurality of components in a group of the components to be statically selected (hereinafter, referred to as a "selective component group") in each component category in accordance with a predetermined selection method. A method in which the user selects the components or a method in which the receiver automatically selects the components in accordance with the throughput of the receiver or the information about the user's taste can be used as the selection method.

For example, "view tag", "language", "required receiver throughput", "view title", or "purpose" can be designated as the attribute of the components to be statically selected in the selective layer.

Specifically, the "view tag" is a tag for combining the different component categories included in a view. For example, when "1" is designated as the "view tag", the video component, audio component, and caption component to which ID "1" is added are selected across the categories. Similarly, when "2" is designated as the "view tag", the components to which ID "2" is added are selected across the categories. Note that the component to which a view tag is not added is independent in each category.

For example, a language code is designated as the "language". For example, a Graphical User Interface (GUI) screen corresponding to the language code is displayed and the user selects the desired language. The throughput required to the receiver is designated as the "required receiver throughput". The required throughput can be designated, for example, with a level value, or codec and resolution can be designated in multiple dimensions. For example, when the required throughput is designated with a level value and a level 2 is designated as the level value, only the receiver with a throughput at the level 2 or higher can be used.

A title for selecting a view screen is designated as the "view title". For example, the view title is displayed in a text format, and the user selects the desired view screen. The information about the purpose of the component, for example, the narration voice for the main voice is designated as the "purpose".

Note that the attributes of the components to be statically selected in the selective layer are examples and another attribute can be selected. Furthermore, not only an attribute is used as the attribute of the components to be statically selected, and the combination of a plurality of attributes can be used.

The attributes of the components to be statically selected can be designated as described above. Thus, the application running in a receiver can select the component in accordance with the attribute of the components to be statically selected. However, when there is only a selective component group, the selection is unnecessary and the selective component group is selected. For example, when the video component, audio component, and caption component in the different categories are combined and grouped with a view tag, the components are selected in a unit of the group.

When the receiver selects a plurality of components from the video components and caption components, a plurality of image and caption screens is displayed. Alternatively, when the receiver selects a plurality of components only form the audio components, the voices are mixed (in Mixing) and are output.

A selective layer exists in each component category in the exemplary component layer structure of FIG. 1. Note that, however, a plurality of selective layers can exist in each component category. Furthermore, the video component, audio component, and caption component are described as the components in the component layer structure of FIG. 1. However, a similar layer structure can be used for another component included in a service.

Exemplary Signaling Information Structure

FIG. 2 is a diagram of an exemplary structure of the signaling information (the control signal) for implementing the component layer structure illustrated in FIG. 1. Note that FIG. 2 illustrates elements and attributes and "@" is attached to the attribute. Each of the indented elements and attributes is designated for the upper element of the indented elements.

As illustrated in FIG. 2, the "topAttribute" attribute is an attribute for the final selection and is defined with m0 types (m0=1, . . . , m0). For example, the selection number and the selection determination are defined as the "topAttribute" attribute. The total number of components to be selected is designated as the selection number. The selection by the user or automatic selection by the receiver is selected as the selection determination.

The information about a selective component group that is the component group to be statically selected is designated as the "SelectiveComponentGroup" element. The "SelectiveComponentGroup" element is the upper element of the "CompositeComponentGroup" element. Note that the frequency of appearance of the "SelectiveComponentGroup" is n1 (n1=1, . . . , n1).

The "selectiveAttribute" attribute indicates a plurality of attributes prescribed for the "SelectiveComponentGroup" element. The attribute of the components to be statically selected is prescribed with m1 types (m1=0, . . . , m1). For example, an individual attribute such as "view tag", "language", "required receiver throughput", "view title", or "purpose" is prescribed as the attribute of the components to be statically selected in the selective layer for the "selectiveAttribute" attribute.

The information about the composite component group that is a component group to be synthesized is designated as the "CompositeComponentGroup" element. The "CompositeComponentGroup" element is the upper element of the "AdaptiveComponent" element. Note that the frequency of appearance of the "CompositeComponentGroup" element is n2 (n2=1, . . . , n2).

The "compositeAttribute" attribute indicates a plurality of attributes prescribed for the "CompositeComponentGroup" element, and the attribute of the components to be synthesized is prescribed with m2 types (m2=0, . . . , m2). For example, an individual attribute such as "scalable", "3D", "tile", "layer", or "mixing" is prescribed as attribute of the components to be synthesized in the composite layer for the "compositeAttribute" attribute. The attributes indicate a type of combination of the components, and the attribute values indicating the elements in the combination can be designated.

The information about the component to be adaptively selected is designated as the "AdaptiveComponent" element. Note that the frequency of appearance of the "AdaptiveComponent" element is n3 (n3=1, . . . , n3).

The "adaptiveAttrbute" attribute indicates a plurality of attributes prescribed for the "AdaptiveComponent" element and the attribute of the components to be adaptively selected is prescribed with m3 types (m3=0, . . . , m3). For example, the transmission channel or bit rate of the component is individually prescribed as the attribute of the components to be adaptively selected in the adaptive layer for the "adaptiveAttrbute" attribute. The ID of the component is designated as the "componentId" attribute.

Note that the data structure of the signaling information for implementing the component layer structure in FIG. 1 described with reference to FIG. 2 is an example, and another data structure can be used. The signaling information is written in a markup language such as Extensible Markup Language (XML).

Specific Example of the Component Layer

A specific example of the component layer will be described with reference to FIGS. 3 to 8.

In a specific example of the component layer in FIG. 3, the "scalable" is designated as the attribute of the components to be synthesized in the video composite layer (Composite Layer). A base stream ("Scalable Base" in the drawing) is transmitted via broadcast and an extended stream ("Scalable Extended" in the drawing) is transmitted via communication in the adaptive layer (Adaptive Layer) that is the lower layer of the Composite Layer. In this example, only a broadcast video component to be adaptively selected is prepared as the base stream and thus the broadcast video component is constantly selected. On the other hand, a plurality of communication video components to be adaptively selected is prepared as the extended stream, and thus the optimal video component is adaptively selected from the communication video components ("Adaptive switching" in the drawing).

To provide an image at 4K resolution, the encoded image signal (video component) at 2K resolution transmitted via broadcast, and the encoded image signal (video component) corresponding to the difference between the image at 4K resolution and the image at 2K resolution transmitted via communication are synthesized in the video composite layer. When, for example, the "required receiver throughput" is designated as the attribute of the components to be statically selected in the selective layer (Selective Layer) and a receiver is compatible with 4K resolution, the receiver can display the synthesized image at 4K resolution ("4K Capable Main View" in the drawing). On the other hand, when the receiver is not compatible with 4K resolution, the receiver uses only the base stream transmitted via broadcast to display the image at 2K resolution ("4K Disable Main View" in the drawing). In other words, the communication video component is not used and thus the adaptive selection of the video component is not performed in this case ("Non switching" in the drawing).

Figure 4:
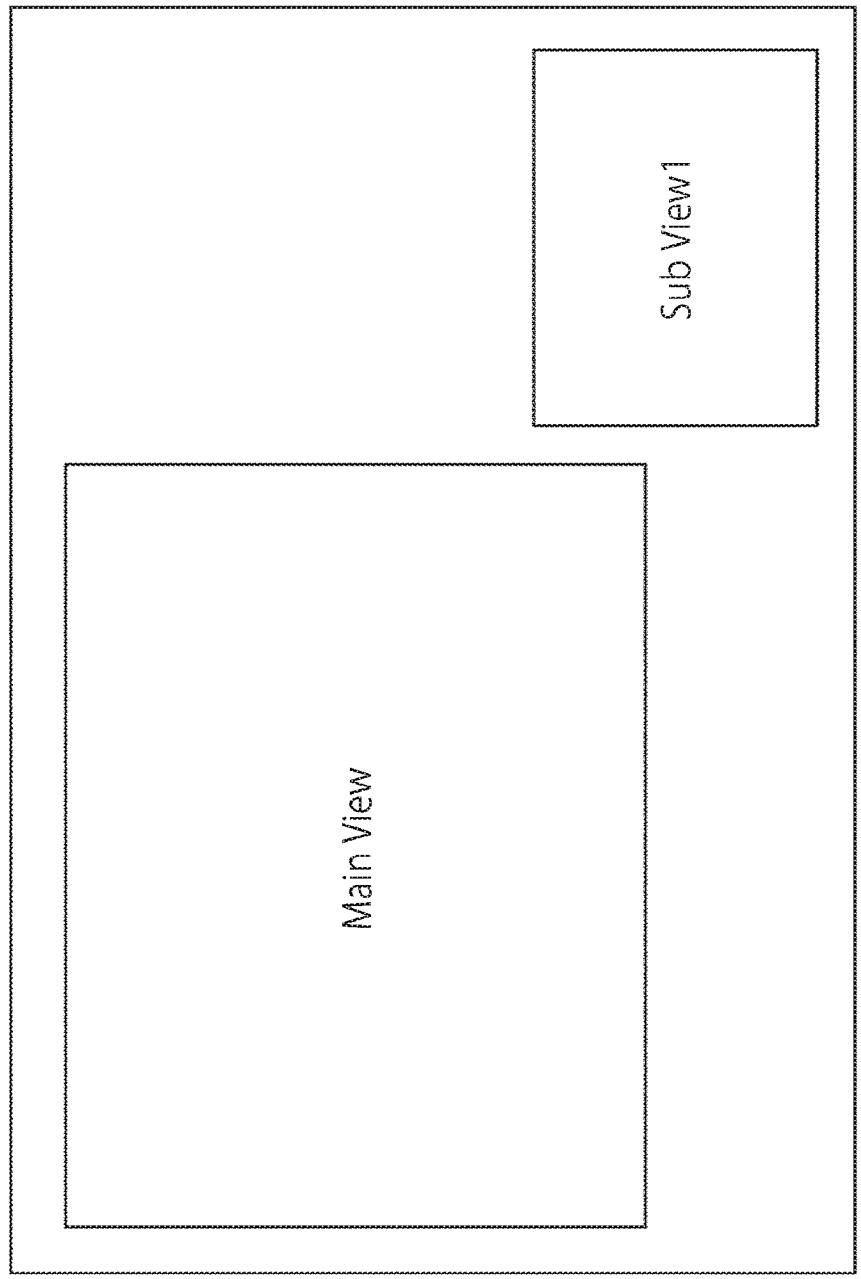
FIG. 4 is a diagram of an exemplary screen layout.

As illustrated in FIG. 4, the main view (Main View) means the main display area in the display screen in this example. The image at 4K resolution or 2K resolution is displayed on the main view. A sub-view (Sub View) that is an auxiliary display area relative to the main display area can be displayed on the exemplary screen in FIG. 4. A sub-view 1 ("Sub View1" in the drawing) and a sub-view 2 ("Sub View2" in the drawing) can be selected as the selective component group in the selective layer in the exemplary component layer in FIG. 3.

Only a communication video component is prepared for the sub-view 1 in the adaptive layer. Thus, the adaptive selection is not performed and the communication video component is constantly selected ("Non switching" in the drawing). A plurality of communication video components to be adaptively selected is prepared for the sub-view 2 in the adaptive layer, and thus the optimal communication video component is adaptively selected from the communication video components as necessary ("Adaptive switching" in the drawing). Although the sub-view 1 is displayed together with the main view in the exemplary screen in FIG. 4, the user can select which view, the main view, the sub-view 1, or the sub-view 2 is displayed, for example, using the GUI screen.

With reference to FIG. 3 again, the "scalable" is designated as the attribute of the components to be synthesized in the audio composite layer (Composite Layer). A stereophonic stream is transmitted via broadcast or communication ("Stereo" in the drawing) and a multi-channel stream ("Multi-channel Dev" in the drawing) is transmitted via communication in the adaptive layer (Adaptive Layer) that is the lower layer of the audio composite layer.

A plurality of audio components to be adaptively selected is prepared as the stereophonic stream, and thus the optimal audio component is adaptively selected from the broadcast or communication audio components ("Adaptive switching" in the drawing) in this example. In other words, the audio component with a normal robustness ("Normal Robustness" in the drawing) and the audio component with a high robustness ("High Robustness" in the drawing) are prepared as the broadcast audio components and one of the audio components can adaptively be selected. This enables the operation, for example, in which only the voice is output when the audio component with a high robustness is selected and it is difficult due to a reason to display the image on the receiver. When it is difficult to receive the broadcast audio component, the communication audio component can be selected.

On the other hand, only an audio component to be adaptively selected is prepared as the multi-channel stream, and thus the communication audio component is constantly selected.

The stereophonic audio component transmitted via broadcast and the multi-channel audio component transmitted via communication are synthesized and a synthesized 22.2 multi-channel component is generated in the audio composite layer. When, for example, the "required receiver throughput" is designated as the attribute of the components to be statically selected in the selective layer (Selective Layer) and the receiver is compatible with 22.2 multiple channels, the receiver can output the synthesized 22.2 multi-channel voice ("22.2ch Capable Main View" in the drawing). On the other hand, when the receiver is not compatible with 22.2 multiple channels, the receiver outputs the stereophonic voice using only the stereophonic stream transmitted via broadcast or communication ("22.2ch Disable Main View" in the drawing).

The view tag 1 is added to the audio components as the attribute of the components to be statically selected in the audio selective layer in this example. The audio components cooperate with the video components to which the view tag 1 is similarly added in the video selective layer. In other words, the voice corresponding to the audio components is output for the image displayed on the main view of the exemplary screen in FIG. 4.

The audio component to which the view tag 2 is added as the attribute of the components to be statically selected in the selective layer cooperates with the video component to which the view tag 2 is similarly added in the video selective layer ("Sub View1" in the drawing). In other words, the voice corresponding to the audio components is output for the image displayed on the sub-view 1 of the exemplary screen in FIG. 4.

The audio component to which the view tag 3 is added as the attribute of the components to be statically selected in the selective layer cooperates with the video component to which the view tag 3 is similarly added in the video selective layer ("Sub View2" in the drawing). Note that only a communication audio component is prepared for each of the audio sub-view 1 and the audio sub-view 2 in the adaptive layer. Thus, the adaptive selection is not performed, and the communication audio component is constantly selected.

As illustrated in FIG. 3, the synthesis of the caption components is not performed in the caption composite layer (Composite Layer) and the adaptive selection of the caption components is also not performed in the adaptive layer (Adaptive Layer). Thus, the caption components in the selective layer (Selective Layer) and the caption components in the adaptive layer correspond, respectively, one by one. Note that only the leftmost caption component among the caption components in the drawings is transmitted via broadcast, and the other caption components are transmitted via communication.

The caption components to which the view tag 1 is added as the attribute of the components to be statically selected in the selective layer cooperate with the video components and audio components to which the view tag 1 is similarly added. Specifically, the English caption and the Spanish caption are provided in this example. Not only the main captions ("Eng(Nor)" and "Spa(Nor)" in the drawing) but also more detailed explanatory captions ("Eng(Ex)" and "Spa(Ex)" in the drawing) are prepared for the captions. When "language" is designated as the attribute of the components to be statically selected in the caption selective layer by the user's selection, the caption in accordance with, for example, the language code of the selected language can be displayed. In other words, the caption of English or Spanish selected by the user is superimposed and displayed on the image displayed on the main view of the exemplary screen in FIG. 4.

The caption components to which the view tag 2 is added as the attribute of the components to be statically selected in the selective layer cooperate with the video component and audio component to which the view tag 2 is similarly added. Specifically, the English caption ("Eng" in the drawing) and the Spanish caption ("Spa" in the drawing) are prepared. Thus, the caption in response to the user's selection can be superimposed and displayed on the image displayed on the sub-view 1 of the exemplary screen in FIG. 4.

The caption components to which the view tag 3 is added as the attribute of the components to be statically selected in the selective layer cooperate with the video component and audio component to which the view tag 3 is similarly added. Specifically, the English caption ("Eng" in the drawing) and the Spanish caption ("Spa" in the drawing) are prepared. Thus, the caption in response to the user's selection can be superimposed and displayed on an image.

Another Specific Example of the Audio Component Layer

Another specific example of the audio component layer will be described next with reference to FIGS. 5 to 8.

Figure 5:
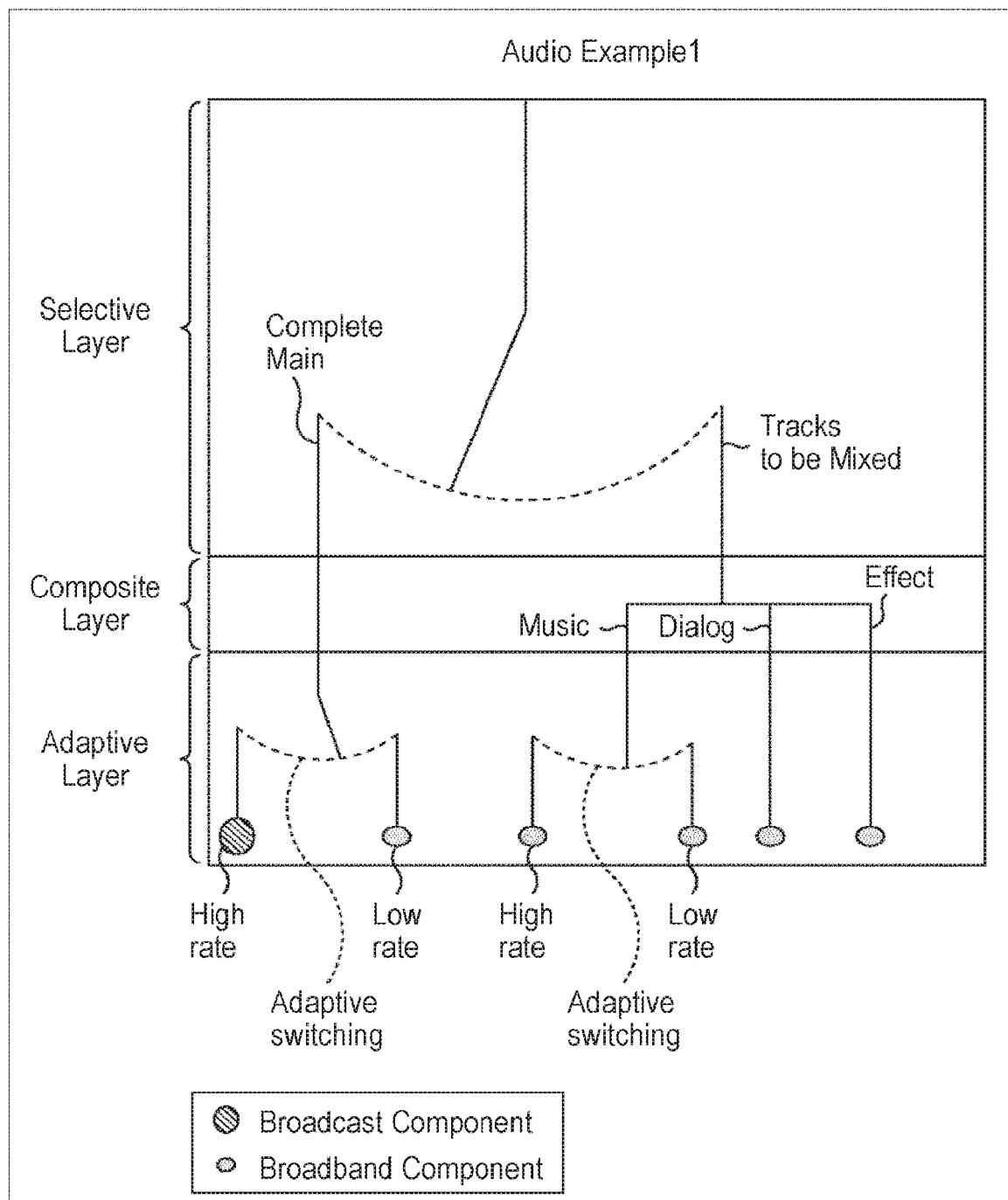
FIG. 5 is a diagram of a specific example of audio component layers.

As illustrated in FIG. 5, for example, a complete version ("Complete Main" in the drawing) or a mixed version ("Tracks to be Mixed" in the drawing) can be designated as the attribute value in the audio selective layer (Selective Layer).

Thus, for example, when the complete version is designated as the attribute value, a complete audio component is provided and the voice corresponding to the audio component is output. Note that a broadcast audio component at a high bit rate and a communication audio component at a low bit rate are prepared as the complete audio stream so that the optimal audio component is adaptively selected ("Adaptive switching" in the drawing).

Alternatively, for example, when the mixed version is designated as the attribute value, a music component ("Music" in the drawing), a dialog component ("Dialog" in the drawing), and an effect component ("Effect" in the drawing) are provided and synthesized so that the voice corresponding to the synthesized component is output. Note that the communication audio components at high and low bit rates are prepared as the music stream so that the optimal audio component is adaptively selected ("Adaptive switching" in the drawing).

Figure 6:
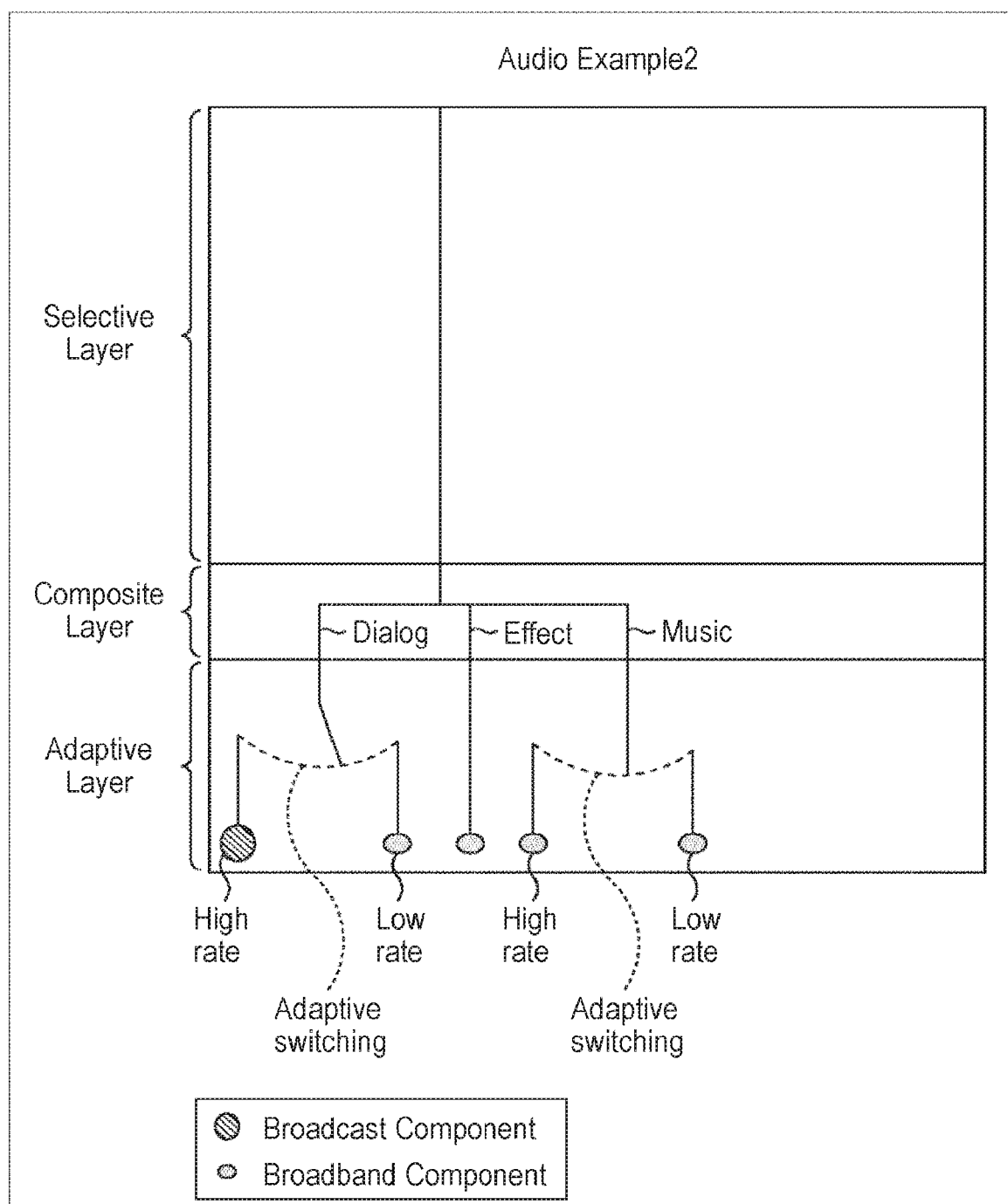
FIG. 6 is a diagram of a specific example of audio component layers.
Figure 7:
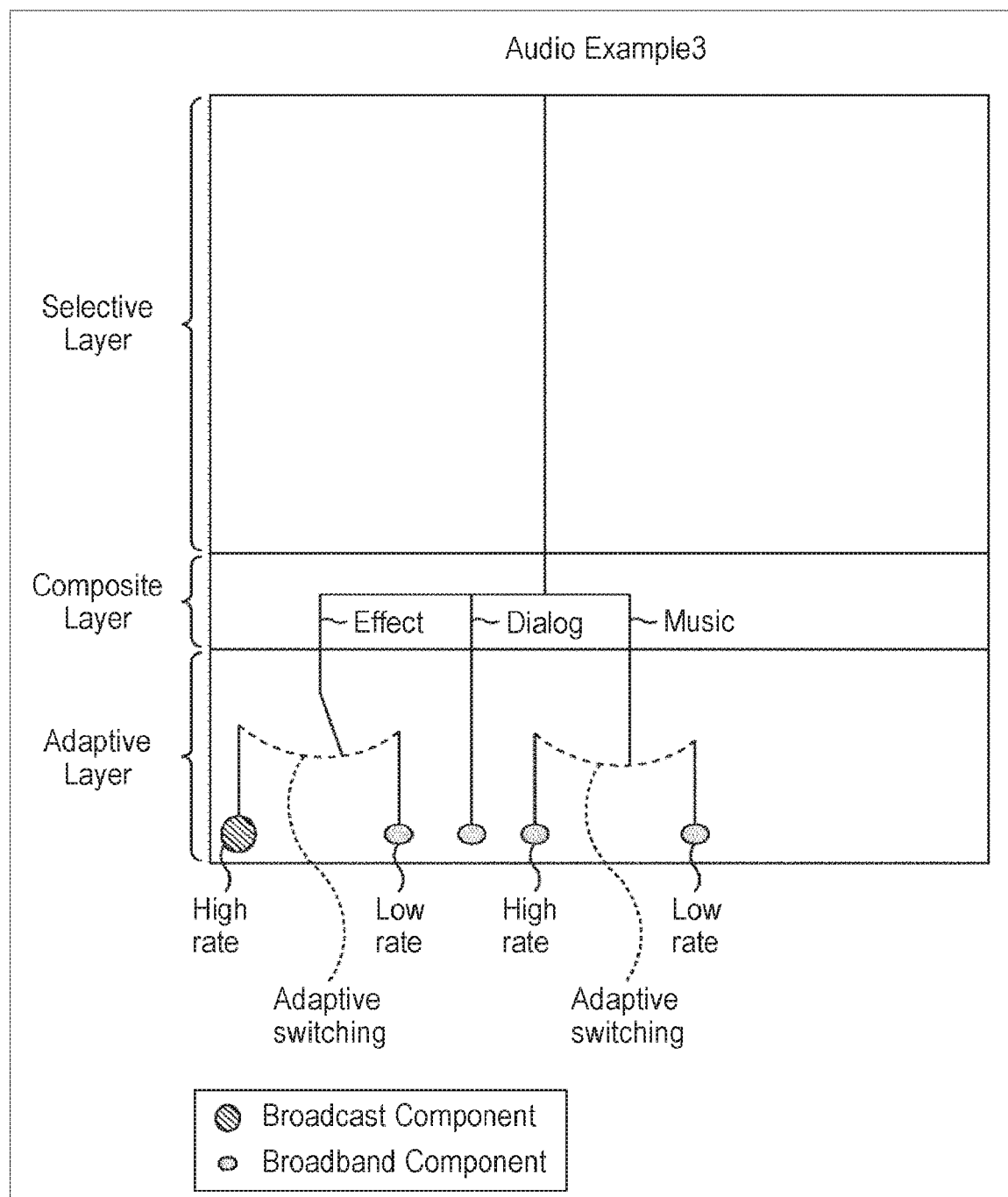
FIG. 7 is a diagram of a specific example of audio component layers.

Note that only a plurality of audio components for the mixed version can be provided without providing an audio component for the complete version as illustrated in FIGS. 6 and 7. In this example, a plurality of components at different bit rates can be prepared not only for the music stream but also for the dialog stream or the effect stream so that the optimal component can adaptively be selected.

Figure 8:
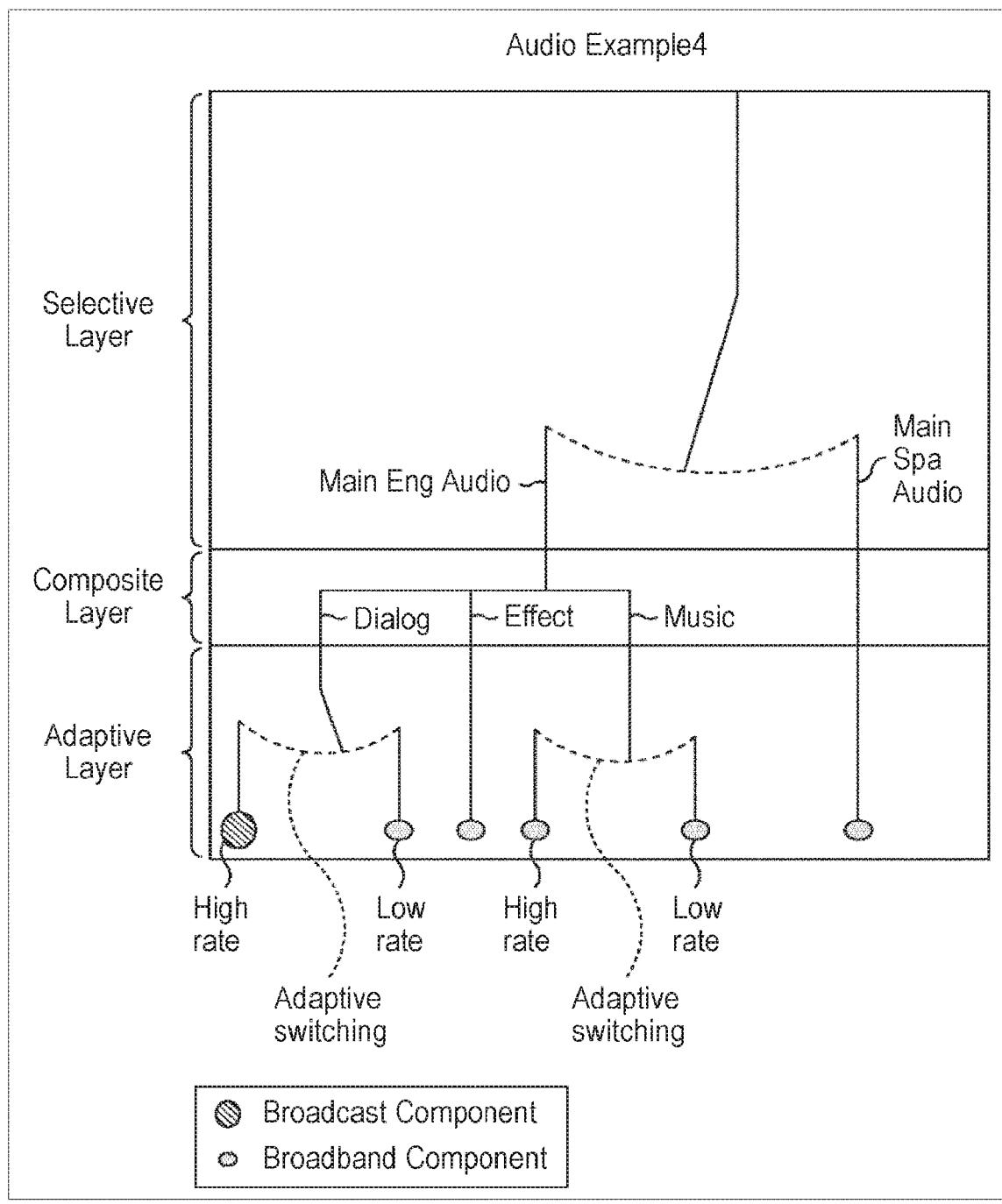
FIG. 8 is a diagram of a specific example of audio component layers.

As illustrated in FIG. 8, for example, the English version ("Main Eng Audio" in the drawing) or the Spanish version ("Main Spa Audio" in the drawing) can be designated as the attribute value of the "language" attribute in the audio selective layer (SELECTIVE LAYER).

Thus, for example, when the English version is designated as the attribute value, the dialog component ("Dialog" in the drawing), the effect component ("Effect" in the drawing), and the music component ("Music" in the drawing) are provided and synthesized so that the English voice corresponding to the synthesized component is output. Note that the broadcast component at a high bit rate and the communication component at a low bit rate are prepared as the dialog stream so that the optimal component is adaptively selected ("Adaptive switching" in the drawing). The communication components at high and low bit rates are prepared for the music stream so that the optimal component is adaptively selected ("Adaptive switching" in the drawing).

For example, when the Spanish version is designated as the attribute value, only an audio component is prepared as the audio stream for the Spanish version. Thus, the audio component is provided and the Spanish voice is output.

2. System Configuration

Configuration of the Broadcast Communication System

Figure 9:
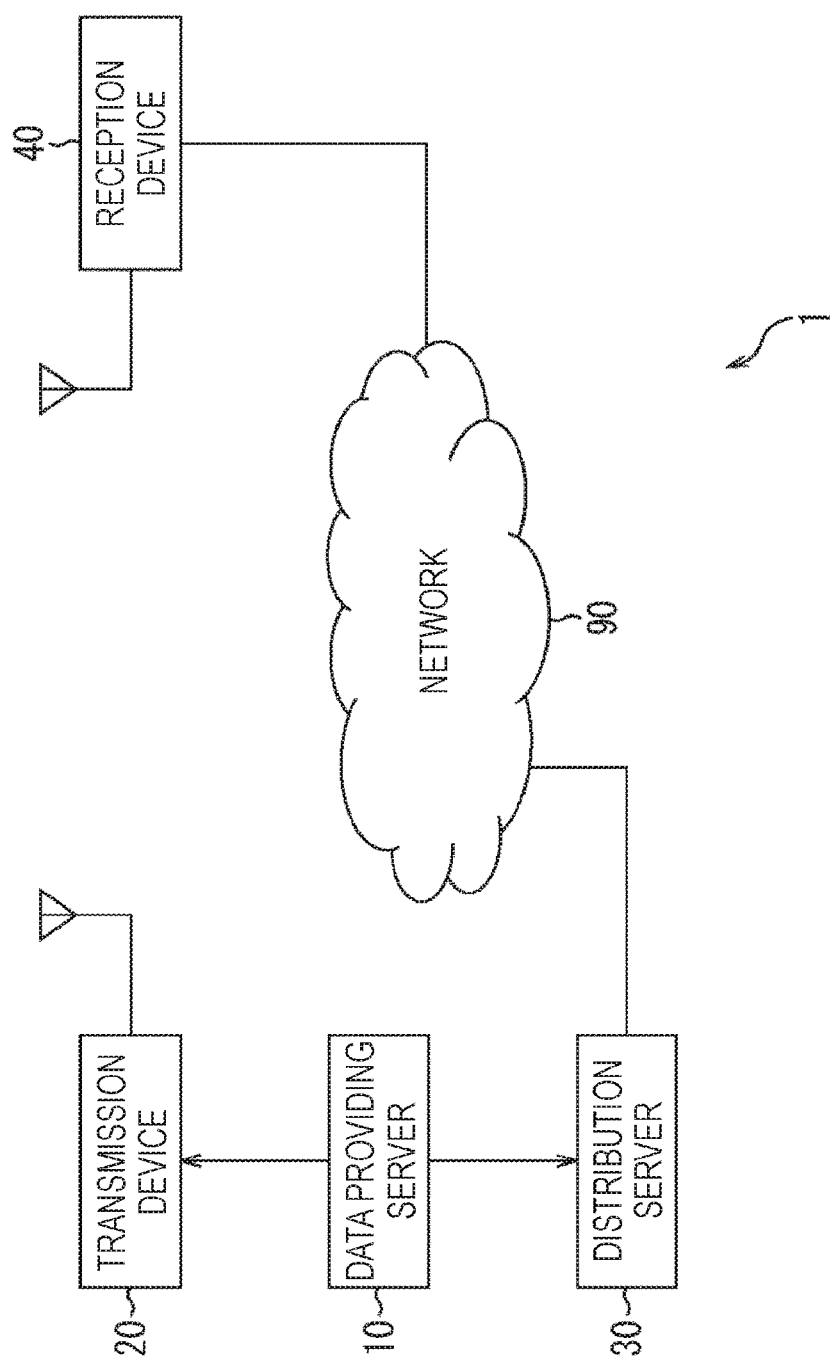
FIG. 9 is a diagram of the configuration of an embodiment of a broadcast communication system using the present invention.

FIG. 9 is a diagram of the configuration of an embodiment of the broadcast communication system using the present invention.

As illustrated in FIG. 9, a broadcast communication system 1 includes a data providing server 10, a transmission device 20, a distribution server 30, and a reception device 40. The distribution server 30 and the reception device 40 are connected to each other via a network 90 such as the Internet.

The data providing server 10 provides various components such as a video component, an audio component, and a caption component to the transmission device 20 and the distribution server 30. In this example, the data providing server 10 provides a video component at 8 Mbps to the transmission device 20, and video components at 1 Mbps, 2 Mbps, 5 Mbps, 10 Mbps, and 20 Mbps to the distribution server 30, respectively, as the components forming a television program in order to implement adaptive streaming distribution in a service, for example, providing the television program.

The transmission device 20 transmits the various components provided from the data providing server 10 (for example, the video component at 8 Mbps) using a broadcast wave of digital broadcasting. The transmission device 20 transmits also the control signal (the signaling information in FIG. 2) together with the component using a broadcast wave of digital broadcasting. Note that the control signal (the signaling information in FIG. 2) can be distributed, for example, from a dedicated server connected to the network 90.

The distribution server 30 distributes various components provided from the data providing server 10 (for example, the video components at 1 Mbps, 2 Mbps, 5 Mbps, 10 Mbps, and 20 Mbps) to the reception device 40 via the network 90 in response to the request from the reception device 40.

The reception device 40 receives the broadcast signal transmitted from the transmission device 20 and obtains the control signal (the signaling information in FIG. 2). The reception device 40 obtains various components such as a video component, an audio component, and a caption component transmitted from the transmission device 20 (for example, the video component at 8 Mbps) in accordance with the control signal. The reception device 40 obtains various components such as a video component, an audio component, and a caption component distributed from the distribution server 30 (for example, the video components at 1 Mbps, 2 Mbps, 5 Mbps, 10 Mbps, and 20 Mbps) in accordance with the control signal.

The reception device 40 displays the image of the video component and the caption component on the display, and outputs the voice of the audio component in synchronization with the image from a loudspeaker. In this example, the optimal video component is adaptively selected and switched among the broadcast video component at 8 Mbps, and the communication video components at 1 Mbps, 2 Mbps, 5 Mbps, 10 Mbps, and 20 Mbps, for example, every predetermined period (for example, every 10 seconds). This implements the adaptive streaming distribution.

Note that the reception device 40 can be a single device including a display and a loudspeaker, or can be embedded, for example, in a television receiver or a video recorder.

The broadcast communication system 1 has the configuration described above. The detailed configuration of each device included in the broadcast communication system 1 in FIG. 9 will be described next.

Configuration of the Transmission Device

Figure 10:
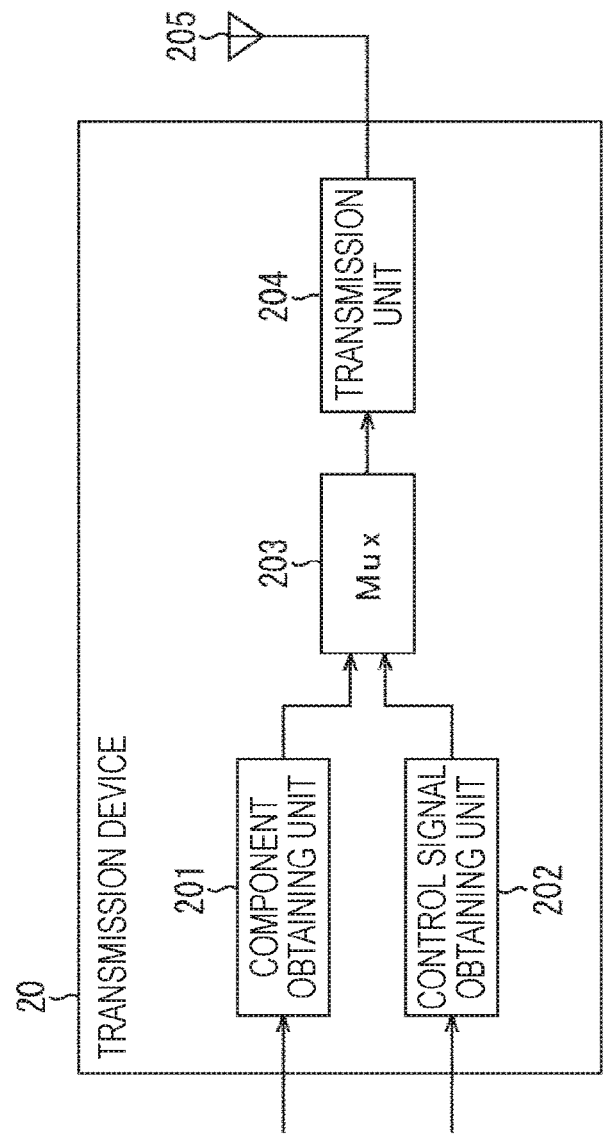
FIG. 10 is a diagram of the configuration of an embodiment of a transmission device using the present invention.

FIG. 10 is a diagram of the configuration of an embodiment of the transmission device using the present invention.

As illustrated in FIG. 10, the transmission device 20 includes a component obtaining unit 201, a control signal obtaining unit 202, an Mux 203, and a transmission unit 204.

The component obtaining unit 201 obtains various components from the data providing server 10 and provides the components to the Mux 203.

The control signal obtaining unit 202 obtains the control signal (the signaling information in FIG. 2) from an external server such as the data providing server 10 or a built-in storage and provides the control signal to the Mux 203.

The Mux 203 multiplexes the various components from the component obtaining unit 201 and the control signal from the control signal obtaining unit 202 to generate a transport stream and provides the transport stream to the transmission unit 204.

The transmission unit 204 transmits the transport stream provided from the Mux 203 as a broadcast signal to the antenna 205.

Configuration of the Distribution Server

Figure 11:
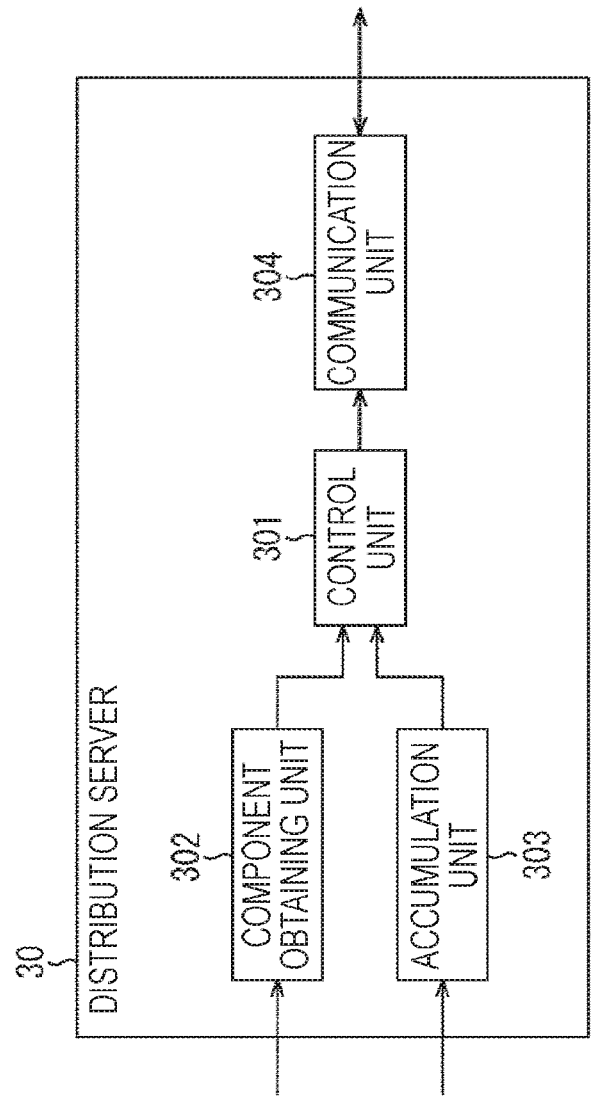
FIG. 11 is a diagram of the configuration of an embodiment of a distribution server using the present invention.

FIG. 11 is a diagram of the configuration of an embodiment of the distribution server using the present invention.

As illustrated in FIG. 11, the distribution server 30 includes a control unit 301, a component obtaining unit 302, an accumulation unit 303, and a communication unit 304.

The control unit 301 controls the operation of each unit in the distribution server 30.

The component obtaining unit 302 obtains various components from the data providing server 10 and provides the components to the control unit 301. The control unit 301 accumulates the various components from the component obtaining unit 302 in the accumulation unit 303. Thus, the various components from the data providing server 10 accumulate in the accumulation unit 303.

The communication unit 304 exchanges various types of data with the reception device 40 via the network 90 in accordance with the control by the control unit 301.

When the communication unit 304 receives a request for distribution of a stream (component) from the reception device 40, the control unit 301 reads the requested component from the accumulation unit 303. The control unit 301 controls the communication unit 304 to distribute the stream including the component read from the accumulation unit 303 to the reception device 40 via the network 90.

Configuration of the Reception Device

Figure 12:
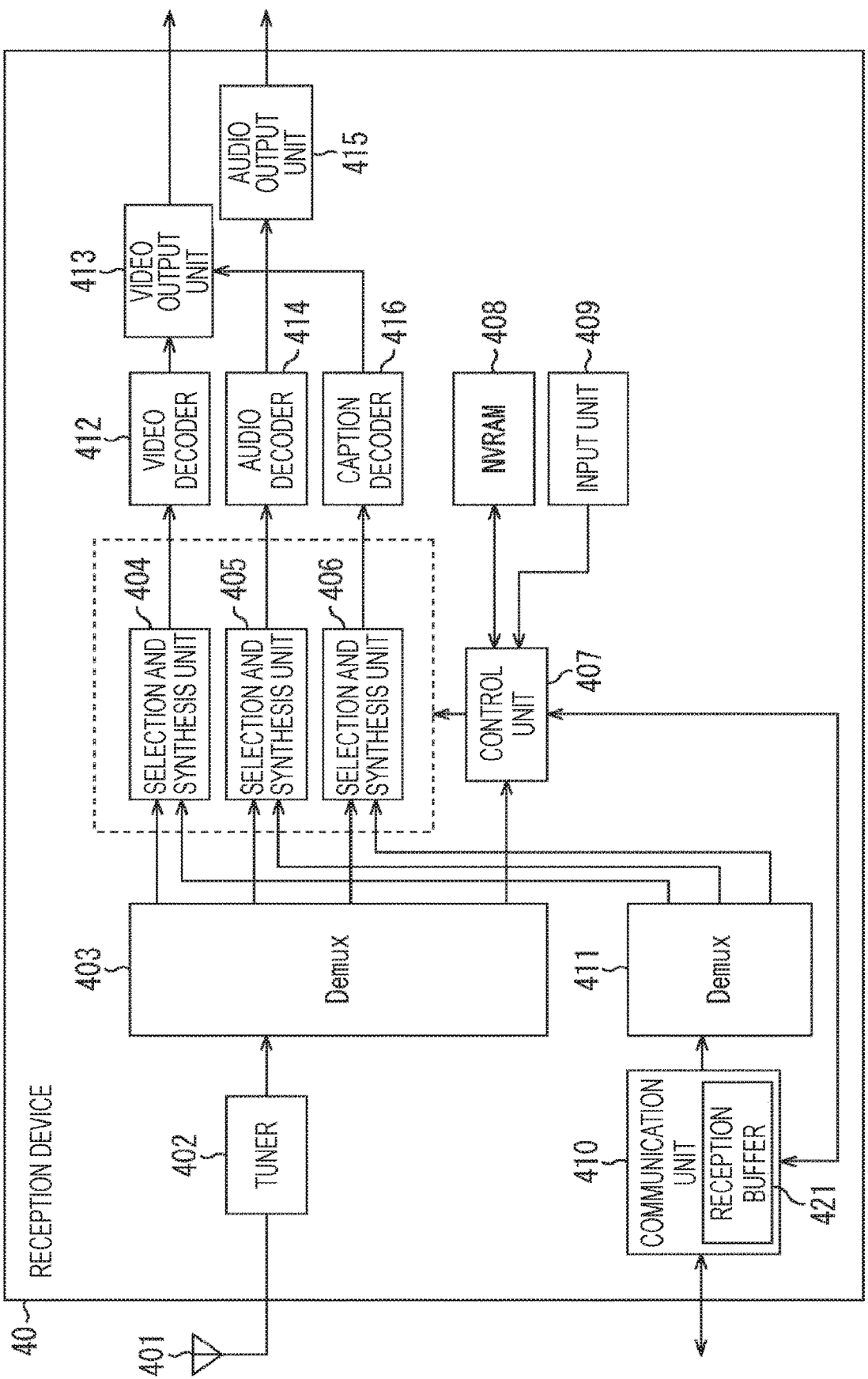
FIG. 12 is a diagram of the configuration of an embodiment of a reception device using the present invention.

FIG. 12 is a diagram of the configuration of an embodiment of the reception device using the present invention.

As illustrated in FIG. 12, the reception device 40 includes a tuner 402, a Demux 403, a selection and synthesis unit 404, a selection and synthesis unit 405, a selection and synthesis unit 406, a control unit 407, an NVRAM 408, an input unit 409, a communication unit 410, a Demux 411, a video decoder 412, a video output unit 413, an audio decoder 414, an audio output unit 415, and a caption decoder 416.

The tuner 402 extracts the broadcast signal on the channel of the selected service from the broadcast signals received from the antenna 401 to demodulate the extracted signal, and provides a transport stream obtained from the demodulated signal to the Demux 403.

The Demux 403 separates the transport stream provided from the tuner 402 into the components and the control signal, and provides the components to the selection and synthesis units 404 to 406 and provides the control signal to the control unit 407. In this example, the components are separated into a video component, an audio component, and a caption component and are provided to the selection and synthesis unit 404, the selection and synthesis unit 405, and the selection and synthesis unit 406, respectively.

The control unit 407 controls the operation of each unit in the reception device 40. The NVRAM 408 is a non-volatile memory, and records various types of data in accordance with the control by the control unit 407. The control unit 407 controls the selection and synthesis process performed by the selection and synthesis units 404 to 406 in accordance with the control signal (the signaling information in FIG. 2) provided from the Demux 403.

The input unit 409 provides an operation signal corresponding to the user operation to the control unit 407. The control unit 407 controls the operation of each unit in the reception device 40 in accordance with the operation signal from the input unit 409.

The communication unit 410 exchanges various types of data with the distribution server 30 via the network 90 in accordance with the control by the control unit 407. The communication unit 410 provides the stream received from the distribution server 30 to the Demux 411. At that time, the communication unit 410 receives the stream distributed from the distribution server 30 while buffering the stream data in a reception buffer 421 provided in the communication unit 410.

The Demux 411 separates the stream provided from the communication unit 410 into components and provides the separated components to the selection and synthesis units 404 to 406. In this example, the video component is provided to the selection and synthesis unit 404, the audio component is provided to the selection and synthesis unit 405, and the caption component is provided to the selection and synthesis unit 406, respectively, after the stream is separated into the components.

The selection and synthesis unit 404 selects and synthesizes the video component from the Demux 403 and the video component from the Demux 411 in a selection and synthesis process (for example, the process performed in each layer of the video component layers in FIG. 1) in accordance with the control by the control unit 407. Then, the selection and synthesis unit 404 provides the video component obtained from the process to the video decoder 412.

The video decoder 412 decodes the video component provided from the selection and synthesis unit 404, and provides the video data obtained from the decoding to the video output unit 413. The video output unit 413 outputs the video data provided from the video decoder 412 to the downstream display (not illustrated). This output displays, for example, the image of a television program on the display.

The selection and synthesis unit 405 selects and synthesizes the audio component from the Demux 403 and the audio component from the Demux 411 in a selection and synthesis process (for example, the process performed in each layer of the audio component layers in FIG. 1) in accordance with the control by the control unit 407. Then, the selection and synthesis unit 405 provides the audio component obtained from the process to the audio decoder 414.

The audio decoder 414 decodes the audio component provided from the selection and synthesis unit 405, and provides the audio data obtained from the decoding to the audio output unit 415. The audio output unit 415 outputs the audio data provided from the audio decoder 414 to the downstream loudspeaker (not illustrated). This outputs the voice, for example, corresponding to the image of a television program from the loudspeaker.

The selection and synthesis unit 406 selects and synthesizes the caption component from the Demux 403 and the caption component from the Demux 411 in a selection and synthesis process (for example, the process performed in each layer of the caption component layers in FIG. 1) in accordance with the control by the control unit 407. Then, the selection and synthesis unit 406 provides the caption component obtained from the process to the caption decoder 416.

The caption decoder 416 decodes the caption component provided from the selection and synthesis unit 406, and provides the caption data obtained from the decoding to the video output unit 413. When the caption decoder 416 provides the caption data to the video output unit 413, the video output unit 413 synthesizes the caption data with the video data from the video decoder 412 and provides the synthesized data to the downstream display (not illustrated). This displays the caption corresponding to the image of a television program together with the image on the display.

The selection and synthesis units 404 to 406 are provided on the upstream side of each decoder in the reception device 40 in FIG. 12 for the sake of description. Note that, however, the selection and synthesis units 404 to 406 can be provided on the downstream side of each decoder depending on the contents of the selection and synthesis process.

3. The Flow of the Process that Each Device Performs

Figure 13:
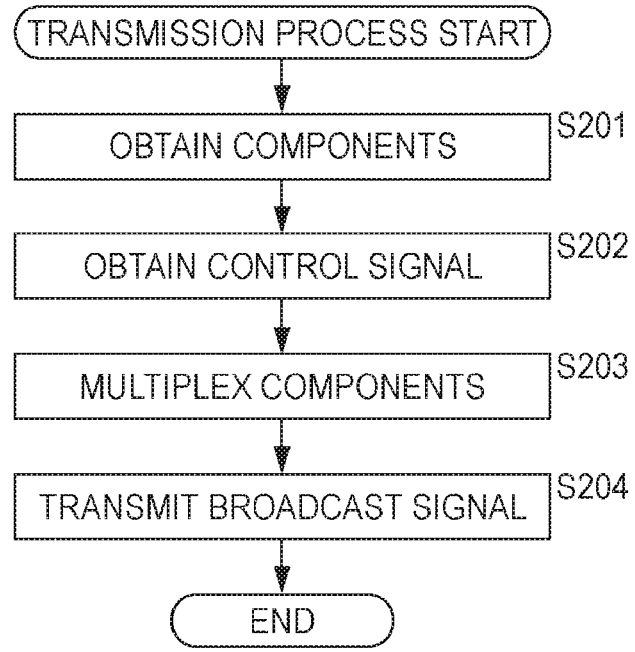
FIG. 13 is an explanatory flowchart of a transmission process.
Figure 14:
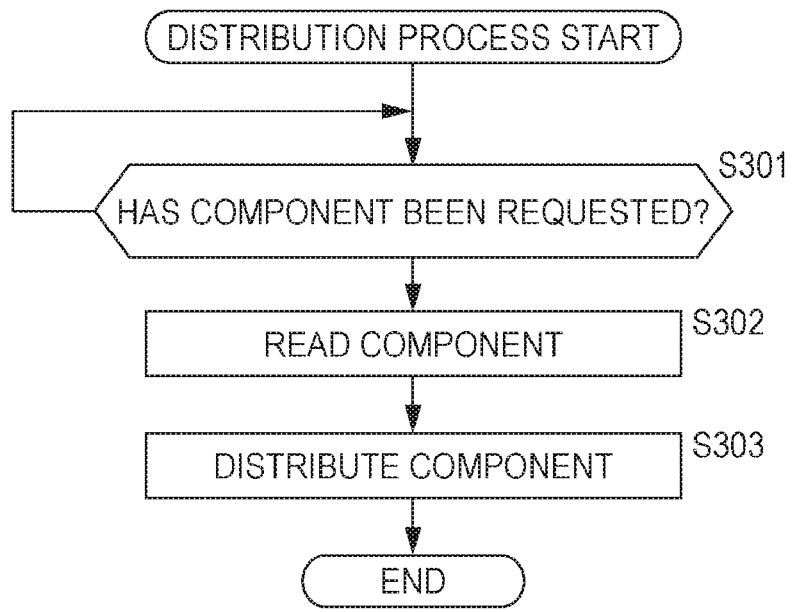
FIG. 14 is an explanatory flowchart of a distribution process.
Figure 15:
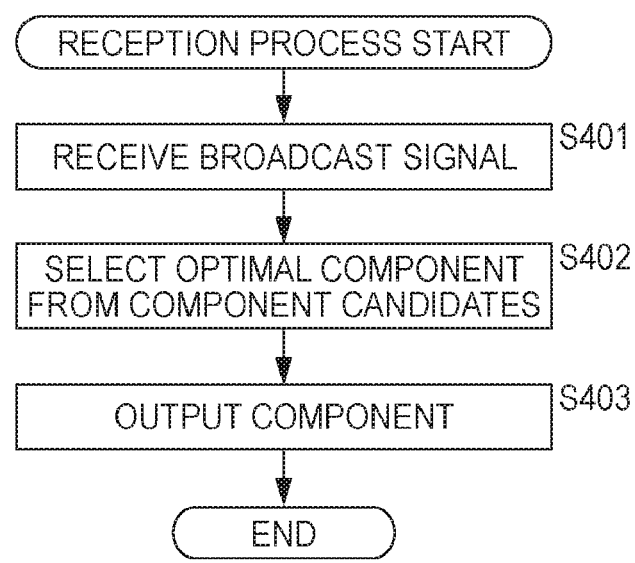
FIG. 15 is an explanatory flowchart of a reception process.

The flow of the process that each device included in the broadcast communication system 1 in FIG. 9 performs will be described next with reference to the flowcharts in FIGS. 13 to 15.

Transmission Process

The transmission process that the transmission device 20 in FIG. 9 performs will be described with reference to the flowchart in FIG. 13.

In step S201, the component obtaining unit 201 obtains various components from the data providing server 10 and provides the components to the Mux 203.

In step S202, the control signal obtaining unit 202 obtains the control signal (the signaling information in FIG. 2), for example, from an external server and provides the control signal to the Mux 203.

In step S203, the Mux 203 multiplexes the various components from the component obtaining unit 201 and the control signal from the control signal obtaining unit 202 to generate a transport stream, and provides the transport stream to the transmission unit 204.

In step S204, the transmission unit 204 transmits the transport stream provided from the Mux 203 as a broadcast signal via the antenna 205. When the process in step S204 is completed, the transmission process in FIG. 13 is completed.

The transmission process has been described above. In the transmission process, the various components provided from the data providing server 10 and the control signal are transmitted on a broadcast wave.

Distribution Process

The distribution process that the distribution server 30 in FIG. 9 performs will be described with reference to the flowchart in FIG. 14. Note that it is assumed that the various components provided from the data providing server 10 previously accumulate in the accumulation unit 303 of the distribution server 30.

In step S301, the control unit 301 constantly monitors the communication unit 304 to determine whether the reception device 40 requests a component via the network 90. The request of a component from the reception device 40 is waited in step S301 and the process goes to step S302.

In step S302, the control unit 301 reads the component requested by the reception device 40 from the accumulation unit 303.

In step S303, the control unit 301 controls the communication unit 304 to distribute the component (stream) read from the accumulation unit 303 via the network 90 to the reception device 40. When the process in step S303 is completed, the distribution process in FIG. 14 is completed.

The distribution process has been described above. In the distribution process, the various components (streams) provided from the data providing server 10 are distributed via the network 90 in response to the request from the reception device 40.

Reception Process

The reception process that the reception device 40 in FIG. 9 performs will be described with reference to the flowchart in FIG. 15. The reception process is performed, for example, when the user starts the reception device 40 by operating a remote controller and instructs channel selection.

In step S401, the tuner 402 receives broadcast signals via the antenna 401 to extract the broadcast signal on the channel of the selected service from the received broadcast signals and demodulate the extracted signal. The Demux 403 separates the transport stream from the tuner 402 into the components and the control signal.

In step S402, the control unit 407 selects the optimal component from the component candidates in accordance with the control signal (the signaling information in FIG. 2) from the Demux 403.

Specifically, the control unit 407 obtains the signaling information in FIG. 2 as the control signal, and thus first recognizes the number of components to be selected based on the "topAttribute" attribute among the candidates. Then, the control unit 407 controls the operation in accordance with the selection determination.

For example, when the user selects the components, the control unit 407 displays the information designated as the attribute of the components to be statically selected for each selective component group on the selective layer that is the highest layer with a GUI screen so that the user selects the selective component group (the components). For example, when the receiver automatically selects the components, the control unit 407 selects the selective component group (the components) in accordance with the information designated as the attribute of the components to be statically selected for each selective component group on the selective layer that is the highest layer.

The component selection process is basically performed per category such as the video component category, or the audio component category. However, when a view tag is designated as the attribute of the components to be statically selected, the selective component group (the components) is selected across the categories.

Next, when there is a plurality of "CompositeComponentGroup" elements in the selected selective component group (the components), the control unit 407 selects the components, which are to be synthesized in accordance with the designated attribute in the composite layer, from the components to be adaptively selected in the adaptive layer that is the lower layer of the composite layer. The control unit 407 controls the selection and synthesis units 404 to 406 to synthesize the components adaptively selected in the synthesis process.

When, for example, the "scalable" is designated as the attribute of the components to be synthesized for the composite component group in this example, a base stream transmitted via broadcast and an extended stream transmitted via communication are synthesized. For example, when the "3D" is designated as the attribute for the composite component group, a right-eye image transmitted via broadcast and a left-eye image transmitted via communication are synthesized.

The example in which there is a plurality of "CompositeComponentGroup" elements has been described. Note that, however, when there is only a "CompositeComponentGroup" element, the optimal component is adaptively selected from the components to be adaptively selected in the lower adaptive layer in the composite layer as necessary.

Alternatively, when there is only a component to be adaptively selected in the adaptive layer, the component is constantly selected.

When the optimal component is selected in the process in step S402, the process goes to step S403. In step S403, the video output unit 413 displays the image corresponding to the video and caption components selected in the process in step S402 on the display. In step S403, the audio output unit 415 outputs the voice corresponding to the audio components selected in the process in step S402 from the loudspeaker. When the process in step S403 is completed, the reception process in FIG. 15 is completed.

The reception process has been described above. In reception process, the optimal component is selected from a plurality of component candidates that can be received via broadcast or communication in accordance with the control signal (the signaling information in FIG. 2) and presented. This enables the user to watch and listen to the image and voice corresponding to the optimal component selected from the component candidates that can be received, for example, when the user selects the channel of a desired television program.

4. Specific Example of Operation

A specific example of the operation that the broadcast communication system 1 using the present invention can implement will be described next.

(1) Multi-View Display Service

In the broadcast communication system 1, the transmission device 10 transmits a broadcast component and the distribution server 30 distributes a communication component. Thus, the reception device 40 displays a first image via broadcast on the main view, and displays a second image via communication on the sub-view. This enables a multi-screen display or a full-screen display of a selected image.

(2) Multilingual Voice and Caption Service

The distribution server 30 distributes a foreign language, such as Spanish, voice or caption (audio or caption component) via the network 90 for a television program via broadcast (video and audio components) transmitted from the transmission device 10. This enables the reception device 40 to output the foreign language voice or superimpose and display the foreign language caption in synchronization with the image of the television program.

(3) Sign Language Image Distribution Service

The distribution server 30 distributes a sign language image (video component) via the network 90 for a television program via broadcast (video and audio components) transmitted from the transmission device 10. This enables the reception device 40 to display the sign language image on a sub-screen on the image of the television program.

(4) Broadcast and Communication Switch Service

While the user watches a television program via broadcast (video and audio components) transmitted from the transmission device 10 on the reception device 40, the distribution server 30 distributes a program (video and audio components) related to the television program via the network 90 in response to the user's selection operation. This enables the user to watch the related program on the reception device 40. Note that a plurality of communication components is prepared and one of the communication components is adaptively selected depending, for example, on the congestion of the communication channel. This selection implements adaptive streaming distribution. When the related program via communication ends, the display is returned to the television program via broadcast.

(5) CM Insertion Service

When a television program via broadcast (video and audio components) transmitted from the transmission device 10 is switched to a commercial message (CM) while the user watches the broadcast television program on the reception device 40, a CM (video and audio components) in accordance with the information about the user's taste is provided from the distribution server 30 via the network 90. This enables the user to watch a CM specialized for the user (Personalized CM). When the CM specialized for the user via communication ends, the display is returned to the television program via broadcast.

(6) Ultra High Definition Television (UHDTV) Compatible Service by Hybrid Distribution For example, in order to provide an image at 4K resolution, it is assumed that the transmission device 10 transmits via broadcast an encoded signal of an image at 2K resolution (video component) as a base stream and the distribution server 30 distributes an encoded image signal (video component) corresponding to the difference between the image at 4K resolution and the image at 2K resolution as an extended stream via the network 90. When the reception device 40 is compatible with 4K resolution in this example, the reception device 40 can synthesize the base stream transmitted via broadcast and the extended stream transmitted via communication and display the image at 4K resolution. Note that, when the reception device 40 is not compatible with 4K resolution, the reception device 40 displays the image at 2K resolution using only the base stream transmitted via broadcast.

Similarly, in order to provide an image at 8K resolution, an encoded signal of an image at 4K resolution (video component) is transmitted as the base stream transmitted via broadcast and an encoded image signal (video component) corresponding to the difference between the image at 8K resolution and the image at 4K resolution is transmitted as the extended stream transmitted via communication. This enables the reception device 40 compatible with 8K resolution to synthesize the streams and display the image at 8K resolution. On the other hand, when the reception device 40 is not compatible with 8K resolution, the reception device 40 displays the image at 4K resolution using only the base stream transmitted via broadcast.

In order to provide an image at frame rate of 120 p, an encoded signal of a 60 p image (video component) is transmitted as the base stream transmitted via broadcast and an encoded image signal (video component) corresponding to the difference between the 120 p, image and the 60 p, image is transmitted as the extended stream transmitted via communication. This enables the reception device 40 compatible with the frame rate of 120 p, to synthesize the streams and display the image at the frame rate of 120 p. On the other hand, when the reception device 40 is not compatible with the frame rate of 120 p, the reception device 40 displays the image at the frame rate of 60 p, using only the base stream transmitted via broadcast.

(7) Voice Combination Service

A language variation voice, a main or explanatory voice, and another content variation voice (audio components) are transmitted from the transmission device 10 or are distributed from the distribution server 30 via the network 90 for a television program via broadcast (video and audio components) transmitted from the transmission device 10. This enables the reception device 40 to mix and provide the voices in response to the user's selection operation.

(8) Adaptive Streaming Distribution Service Across Broadcast and Communication In the broadcast communication system 1, the transmission device 10 transmits a component or a plurality of components, and the distribution server 30 distributes a component or a plurality of components via the network 90. The reception device 40 adaptively selects one of the broadcast and communication components and can provide an image with a quality as high as possible. For example, the transmission device 10 transmits an image at 2K resolution (video component) while the distribution server 30 distributes an image at 4K resolution (video component) via the network 90. This enables the reception device 40 to implement the adaptive streaming distribution across broadcast and communication, for example, by basically displaying the image at 4K resolution via communication and displaying the image at 2K resolution via broadcast that the reception device 40 can stably receive depending on the congestion of the network 90.

5. Computer Configuration

The sequence of processes described above can be performed with hardware or software. When the sequence of processes is performed with software, the program of the software is installed on a computer. The computer is, for example, a computer embedded in dedicated hardware, or a general-purpose computer capable of executing various functions by installing various programs.

FIG. 16 is a block diagram of an exemplary configuration of the computer hardware that performs the sequence of processes with the programs.

In a computer 900, a Central Processing Unit (CPU) 901, a Read Only Memory (ROM) 902, and a Random Access Memory (RAM) 903 are connected to each other via a bus 904. Additionally, an input and output interface 905 is connected to the bus 904. An input unit 906, an output unit 907, a recording unit 908, a communication unit 909, and a drive 910 are connected to the input and output interface 905.

The input unit 906 includes, for example, a keyboard, a mouse, and a microphone. The output unit 907 includes, for example, a display, and a loudspeaker. The recording unit 908 includes, for example, a hard disk or a non-volatile memory. The communication unit 909 includes, for example, a network interface. The drive 910 drives a removable medium 911 such as a magnetic disk, an optical disk, a magneto-optical disk, or a semiconductor memory.

The computer 900 having the configuration described above performs the sequence of processes, for example, by causing the CPU 901 to load the program stored in the recording unit 908 onto the RAM 903 via the input and output interface 905 and the bus 904 and execute the loaded program.

The program that the computer 900 (CPU 901) executes can be provided after being recorded in the removable medium 911, for example, as a package medium. Alternatively, the program can be provided via a wired or wireless communication medium such as a Local Area Network, the Internet, or digital satellite broadcast.

The computer 900 can install the program via the input and output interface 905 onto the recording unit 908 by attaching the removable medium 911 to the drive 910. The program can be received with the communication unit 909 via a wired or wireless communication medium and installed onto the recording unit 908. Alternatively, the program can previously be installed on the ROM 902 or the recording unit 908.

Note that the program that the computer 900 executes can be a program that chronologically performs the processes in the order described herein, or a program that performs the processes in parallel, or at a time when the execution is necessary, for example, when the program is invoked.

Each process step that describes the program that causes the computer 900 to perform each process is not necessarily executed chronologically in the order illustrated as the flowchart, and the processes include processes performed in parallel or individually (for example, parallel processing or processing by the object) herein.

The program can be executed by a computer, or by a plurality of computers in decentralized processing. Alternatively, the program can also be executed after being transferred to a remote computer.

The system is a collection of a plurality of components (for example, devices, or modules (parts)) herein. It does not matter if all of the components are housed in a housing. Thus, each of the devices housed in different housings and connected via a network, and an apparatus in which the modules are housed in a housing is a system.

Note that the embodiments of the present invention are not limited to the embodiments described above, and can variously be changed without departing from the gist of the present invention. For example, the present invention can be the configuration in the cloud computing in which a function can be shared by a plurality of devices and performed by the cooperation of the devices via a network.

Each step described in the flowcharts can be performed by a device or shared and performed by a plurality of devices. When a step includes a plurality of processes, the processes in the step can be performed by a device or shared and performed by a plurality of devices.

Note that the present invention can have the following configuration.

(1) A reception device including:

a first reception unit that receives a component transmitted on a broadcast wave;

a second reception unit that receives a component distributed via a network; and a control unit that controls operation of each unit, wherein the control unit selects an optimal component from a plurality of components that the reception device is able to receive.

REFERENCE SIGNS LIST

1 Broadcast communication system
10 Data providing server
20 Transmission device 30 Distribution server
40 Reception device
201 Component obtaining unit
202 Control signal obtaining unit
203 Mux
204 Transmission unit
301 Control unit
302 Component obtaining unit
303 Accumulation unit
304 Communication unit
402 Tuner
403 Demux
404, 405, 406 Selection and synthesis unit
407 Control unit
408 NVRAM
409 Input unit
410 Communication unit
411 Demux
412 Video decoder
413 Video output unit
414 Audio decoder
415 Audio output unit
416 Caption decoder
421 Reception buffer
90 Network
900 Computer
901 CPU

The invention claimed is:

1. A reception device comprising:
a receiver configured to receive a first component, a second component, and at least another component belonging to one of at least two categories including audio and video;
a control circuitry configured to control operation of the receiver,
wherein in a third layer, the control circuitry is configured to select the first component or the second component as a first selected component,
in a second layer, the control circuitry is configured to synthesize the first selected component in the third layer and a component not selected in the third layer into a synthesized component,
in a first layer, the control circuitry is configured to select the first selected component selected in the third layer or the synthesized component as a selected component for the one of the at least two categories, and the control circuitry is configured to output the selected component for the one of the at least two categories to a rendering device.

2. The reception device of claim 1, wherein the first component is a broadcast component and the second component is a communication component.

3. The reception device of claim 2, wherein
in the third layer, the control circuitry selects the first selected component at an optimal bit rate from the first component and the second component at different bit rates depending on variations in Carrier or Noise (C/N) of a broadcast signal including the first component or congestion of a communication channel carrying the second component.

4. The reception device of claim 3, wherein
the first selected component in the third layer is a base layer and the component not selected in the third layer is an extended layer.

5. The reception device of claim 3, wherein
in the first layer, the control circuitry selects the component in accordance with throughput of the reception device.

6. The reception device of claim 2, wherein
components in different categories are linked to each other with a view tag.

7. A method comprising:
receiving, by a receiving device, a first component, a second component, and at least another component belonging to one of at least two categories including audio and video;
in a third layer, selecting, by the receiving device, the first component or the second component as a first selected component,
in a second layer, synthesizing, by the receiving device, the first selected component in the third layer and a component not selected in the third layer into a synthesized component,
in a first layer, selecting, by the receiving device, the first selected component selected in the third layer or the synthesized component as a selected component for the one of the at least two categories, and
outputting the selected component for the one of the at least two categories to a rendering device.

8. The method of claim 7, wherein the first component is a broadcast component and the second component is a communication component.

9. The method of claim 8, wherein
in the third layer, the first selected component is selected at an optimal bit rate from the first component and the second component at different bit rates depending on variations in Carrier or Noise (C/N) of a broadcast signal including the first component or congestion of a communication channel carrying the second component.

10. The method of claim 8, wherein
the first selected component in the third layer is a base layer and the component not selected in the third layer is an extended layer.

11. The method of claim 8, wherein
in the first layer, the selected component for the one of the at least two categories is selected in accordance with throughput of the receiving device.

12. The method of claim 7, wherein
components in different categories are linked to each other with a view tag.

13. A non-transitory computer readable medium including executable instructions, which when executed by a computer cause the computer to execute a method in a receiving device, the method comprising:
receiving, by the receiving device, a first component, a second component, and at least another component belonging to one of at least two categories including audio and video;
in a third layer, selecting, by the receiving device, the first component or the second component as a first selected component,
in a second layer, synthesizing, by the receiving device, the first selected component in the third layer and a component not selected in the third layer into a synthesized component,
in a first layer, selecting, by the receiving device, the first selected component selected in the third layer or the synthesized component as a selected component for the one of the at least two categories, and outputting the selected component for the one of the at least two categories to a rendering device.

14. The non-transitory computer readable medium of claim 13, wherein the first component is a broadcast component and the second component is a communication component.

15. The non-transitory computer readable medium of claim 14, wherein
in the third layer, the first selected component is selected at an optimal bit rate from the first component and the second component at different bit rates depending on variations in Carrier or Noise (C/N) of a broadcast signal including the first component or congestion of a communication channel carrying the second component.

16. The non-transitory computer readable medium of claim 14, wherein
the first selected component in the third layer is a base layer and the component not selected in the third layer is an extended layer.

17. The non-transitory computer readable medium of claim 14, wherein
in the first layer, the selected component for the one of the at least two categories is selected in accordance with throughput of the receiving device.

18. The non-transitory computer readable medium of claim 13, wherein
components in different categories are linked to each other with a view tag.

* * * * *